US012118914B2

(12) United States Patent
Huang

(10) Patent No.: US 12,118,914 B2
(45) Date of Patent: Oct. 15, 2024

(54) DISPLAY CONTROL METHOD AND DISPLAY DEVICE

(71) Applicant: Shenzhen China Star Optoelectronics Semiconductor Display Technology Co., Ltd., Guangdong (CN)

(72) Inventor: Zeng Huang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/498,009

(22) Filed: Oct. 30, 2023

(65) Prior Publication Data

US 2024/0221576 A1 Jul. 4, 2024

(30) Foreign Application Priority Data

Dec. 31, 2022 (CN) ......................... 202211736202.3

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2300/0842* (2013.01); *G09G 2320/0233* (2013.01); *G09G 2320/0247* (2013.01); *G09G 2320/0626* (2013.01); *G09G 2340/0435* (2013.01); *G09G 2360/16* (2013.01); *G09G 2360/18* (2013.01)

(58) Field of Classification Search
CPC .................. G09G 3/2007; G09G 3/32; G09G 2300/0842; G09G 2320/0233; G09G 2320/0247; G09G 2320/0626; G09G 2340/0435; G09G 2360/16; G09G 2360/18
See application file for complete search history.

(56) References Cited

U.S. PATENT DOCUMENTS

| | | | | |
|---|---|---|---|---|
| 2014/0267448 A1* | 9/2014 | Albrecht | G09G 3/3406 345/84 |
| 2017/0140694 A1* | 5/2017 | Chen | G09G 3/3611 |
| 2017/0243548 A1* | 8/2017 | Wang | G09G 3/20 |
| 2024/0087494 A1* | 3/2024 | Wen | G09G 3/2011 |

* cited by examiner

*Primary Examiner* — Abhishek Sarma
(74) *Attorney, Agent, or Firm* — PV IP PC; Wei Te Chung

(57) ABSTRACT

A display control method determines whether a low frame rate compensation function is in an on state when a frame rate of a current frame rendered by a graphics processor is smaller than a minimum refresh rate of a display panel, performs grayscale compensation on at least one frame of display picture in consecutive n frames of display pictures of the display panel when the low frame rate compensation function is in the on state, and controls the display panel to display the compensated consecutive n frames of display pictures.

10 Claims, 6 Drawing Sheets

Determining whether a difference between a product of the frame rate of the current frame rendered by the graphics processor and n and a frame rate of a previous frame rendered by the graphics processor exceeds a second preset range

↓

Determining, when the difference is within the second preset range, the low framerate compensation function of the display panel is in an off state to stop compensating for a grayscale corresponding to a display image of the display panel starting from the current frame

FIG. 3G

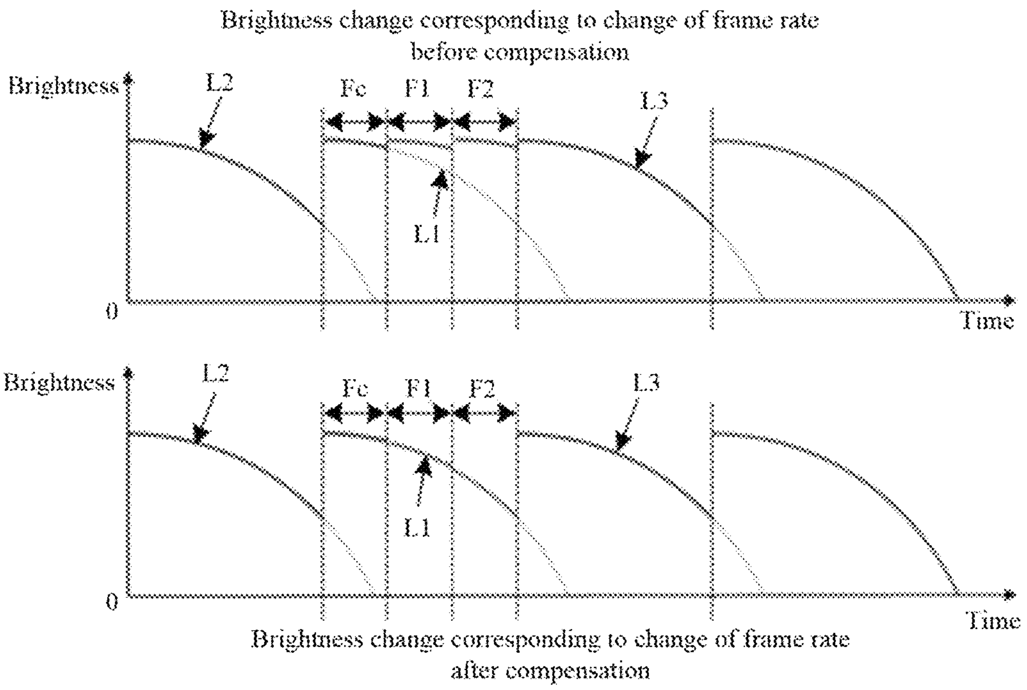

FIG. 4A

DISPLAY CONTROL METHOD AND DISPLAY DEVICE

CROSS-REFERENCE TO RELATED APPLICATION

This application claims priority to Chinese Patent Application No. 202211736202.3, filed on Dec. 31, 2022, the disclosure of which is incorporated herein by reference in its entirety.

TECHNICAL FIELD

The present disclosure relates to the field of display technologies, and in particular, to a display control method and a display device.

BACKGROUND

A variable refresh rate (VRR) technology can improve a problem that a rendering rate of a graphics card does not match a refresh rate of a display, and a low frame rate compensation technology can improve a display problem or a picture tearing problem occurred when the rendering rate of the graphics card is lower than a minimum refresh rate supported by the display. However, the low frame rate compensation technology is that, when the rendering rate of the graphics card is lower than the minimum refresh rate supported by the display, a frame is displayed three times at the graphics card end by multiplying its frame rate with three times, so as to complete a normal display of the frame. Therefore, before and after the frame rate is multiplied, there is a problem of picture flickering caused by excessive frame rate jump.

SUMMARY

Embodiments of the present disclosure provide a display control method and a display device.

Specifically, a display control method according to an embodiment of the present disclosure for controlling a display picture of a display panel, including: in response to a frame rate of a current frame rendered by a graphics processor being smaller than a minimum refresh rate of the display panel, determining whether a low frame rate compensation function of the display panel is in an on state; in response to determining that the low frame rate compensation function of the display panel is in the on state, performing grayscale compensation on at least one frame of display picture in consecutive n frames of display pictures of the display panel, where the consecutive n frames of display pictures include a current frame of display picture corresponding to the current frame, the consecutive n frames of display pictures have the same grayscales, and n is an integer greater than 1; and controlling the display panel to display the compensated consecutive n frames of display pictures.

In some embodiments of the present disclosure, the determining whether the low frame rate compensation function of the display panel is in the on state includes: determining, based on a first frame rate corresponding to a previous frame rendered by the graphics processor and the frame rate corresponding to the current frame, whether the low frame rate compensation function of the display panel is in the on state.

In some embodiments of the present disclosure, the step of determining, based on the first frame rate corresponding to the previous frame rendered by the graphics processor and the frame rate corresponding to the current frame, whether the low frame rate compensation function of the display panel is in the on state includes: determining whether a difference between a product of the first frame rate and a frame rate multiplication value and the frame rate corresponding to the current frame exceeds a first preset range, where the frame rate multiplication value is n; and in response to determining that the difference is in the first preset range, determining that the low frame rate compensation function of the display panel is in the on state.

In some embodiments of the present disclosure, the consecutive n frames of display pictures further include a first frame of display picture after the current frame of display picture, and a second frame of display picture after the first frame of display picture, where the performing of grayscale compensation on the at least one frame of display picture includes: in response to determining that the low frame rate compensation function is in the on state, selecting a first compensation value and a second compensation value both corresponding to the frame rate of the current frame from a compensation table including correspondences between preset frame rates and compensation values, where the first compensation value and the second compensation value are not equal to each other; and compensating for a grayscale corresponding to the first frame of display picture based on the first compensation value, and compensating for a grayscale corresponding to the second frame of display picture based on the second compensation value, to reduce a difference between a brightness attenuation curve corresponding to all of the current frame of display picture, the first frame of display picture, and the second frame of display picture and a preset brightness attenuation curve corresponding to the consecutive n frames of display pictures in response to the low frame rate compensation function of the display panel being in the on state.

In some embodiments of the present disclosure, the compensating for a grayscale corresponding to the first frame of display picture based on the first compensation value, and compensating for a grayscale corresponding to the second frame of display picture based on the second compensation value includes: obtaining a first compensation grayscale based on a product of a first original grayscale corresponding to the first frame of display picture and the first compensation value, to enable the first original grayscale corresponding to the first frame of display picture to be the first compensation grayscale; and obtaining a second compensation grayscale based on a product of a second original grayscale corresponding to the second frame of display picture and the second compensation value, to enable the second original grayscale corresponding to the second frame of display picture to be the second compensation grayscale.

In some embodiments of the present disclosure, the consecutive n frames of display pictures further include a first frame of display picture after the current frame of display picture, and a second frame of display picture after the first frame of display picture; where the performing of grayscale compensation on the at least one frame of display picture includes: in response to determining that the low frame rate compensation function is in the on state, selecting a compensation value corresponding to the frame rate of the current frame from a compensation table including correspondences between preset frame rates and compensation values; and compensating for grayscales corresponding to the current frame of display picture, the first frame of display picture and the second frame of display picture based on the compensation value, respectively, to reduce a difference between average brightness corresponding to all of the current frame of display picture, the first frame of display picture, and the second frame of display picture and preset average brightness corresponding to the consecutive n frames of display pictures in response to the low frame rate compensation function of the display panel being in the on state.

In some embodiments of the present disclosure, the step of compensating for grayscales corresponding to the current frame of display picture, the first frame of display picture and the second frame of display picture based on the compensation value, respectively includes: obtaining a third compensation grayscale based on a product of a third original grayscale corresponding to the current frame of display picture and the compensation value, to enable the third original grayscale corresponding to the current frame of display picture to be the third compensation grayscale; obtaining a fourth compensation grayscale based on a product of a fourth original grayscale corresponding to the first frame of display picture and the compensation value, to enable the fourth original grayscale corresponding to the first frame of display picture to be the fourth compensation grayscale; and obtaining a fifth compensation grayscale based on a product of a fifth original grayscale corresponding to the second frame of display picture and the compensation value, to enable the fifth original grayscale corresponding to the second frame of display picture to be the fifth compensation grayscale.

In some embodiments of the present disclosure, the display control method further includes: after the controlling of the display panel to display the compensated consecutive n frames of display pictures, determining whether a difference between a product of the frame rate of the current frame rendered by the graphics processor and n and a frame rate of a previous frame rendered by the graphics processor exceeds a second preset range; and in response to determining that the difference is in the second preset range, determining that the low frame rate compensation function of the display panel is in an off state to stop compensating for a grayscale corresponding to a display picture of the display panel starting from the current frame.

An embodiment of the present disclosure provides a display device, including a display panel and a control module. The display panel is configured to display a picture. The control module is configured to: in response to a frame rate of a current frame rendered by a graphics processor being smaller than a minimum refresh rate of the display panel, determining whether a low frame rate compensation function of the display panel is in an on state; and in response to determining that the low frame rate compensation function of the display panel is in the on state, performing grayscale compensation on at least one frame of display picture in consecutive n frames of display pictures of the display panel to control the display panel to display the compensated consecutive n frames of display pictures, where the consecutive n frames of display pictures include a current frame of display picture corresponding to the current frame, the consecutive n frames of display pictures have the same grayscales, and n is an integer greater than 1.

In some embodiments of the present disclosure, the control module includes a controller, including a frame buffer configured to obtain the frame rate of the current frame.

BRIEF DESCRIPTION OF THE DRAWINGS

In order to more clearly illustrate technical solutions in embodiments of the present disclosure, drawings used in the description of the embodiments will be briefly introduced below. Apparently, the drawings in the following description are only some embodiments of the present disclosure, and for those skilled in the art, other drawings can be obtained according to these illustrated drawings without creative work.

FIG. 3A through FIG. 3G are schematic flowcharts associated with a display control method according to embodiments of the present disclosure.

FIG. 4A and FIG. 4B are schematic diagrams of brightness change curves of consecutive n frames of display pictures of a display panel respectively before and after compensation according to an embodiment of the present disclosure.

DETAILED DESCRIPTION

In the following, technical solutions of embodiments of the present disclosure will be clearly and completely described with reference to the accompanying drawings of the embodiments of the present disclosure. Apparently, the described embodiments are only some of embodiments of the present disclosure, not all of embodiments of the present disclosure. Based on the described embodiments of the present disclosure, all other embodiments obtained by those skilled in the art without creative work are within the scope of protection of the present disclosure. Moreover, it is to be understood that, specific embodiments described herein are merely intended to illustrate and explain the present disclosure and are not intended to limit the present disclosure. In the present disclosure, in the absence of a statement to the contrary, used orientational terms such as "up" and "down" generally refer to up and down of a device in actual use or working state, and in particular to orientations of the accompanying drawing; and "inner" and "outer" are with respect to an outline of the device.

Figure 1:
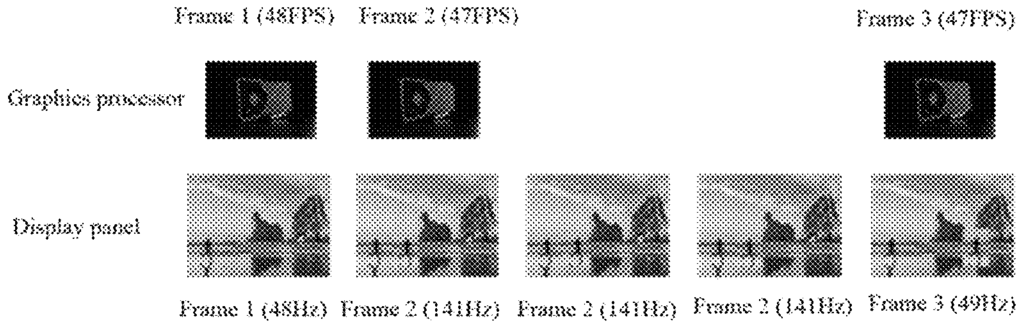
FIG. 1 is a schematic diagram of rendered frames of a graphics processor and display pictures of a display panel when a low frame rate compensation function is in an on state.

Specifically, FIG. 1 is a schematic diagram of rendered frames of a graphics processor and display pictures of a display panel when a low frame rate compensation function is in an on state. When a frame rate falls below a minimum refresh rate supported by the display panel, the low frame rate compensation function is triggered; and when the low frame rate compensation function is in the on state, the graphics processor copies a rendered current frame multiple times to make the display panel display the current frame multiple times, thereby matching a refresh rate range supported by the display panel. For example, a variable refresh rate range of the display panel is 48 Hz-144 Hz. When a rendering rate of the graphics processor is 47 frames per second (47 FPS), the low frame rate compensation function would be triggered, and the graphics processor sends the rendered current frame to the display panel at a refresh rate of 47*3=141 Hz for display three times. However, there will be a difference in display brightness before and after the multiplication of frame rate, which will cause the problem of picture flickering.

Figure 2:
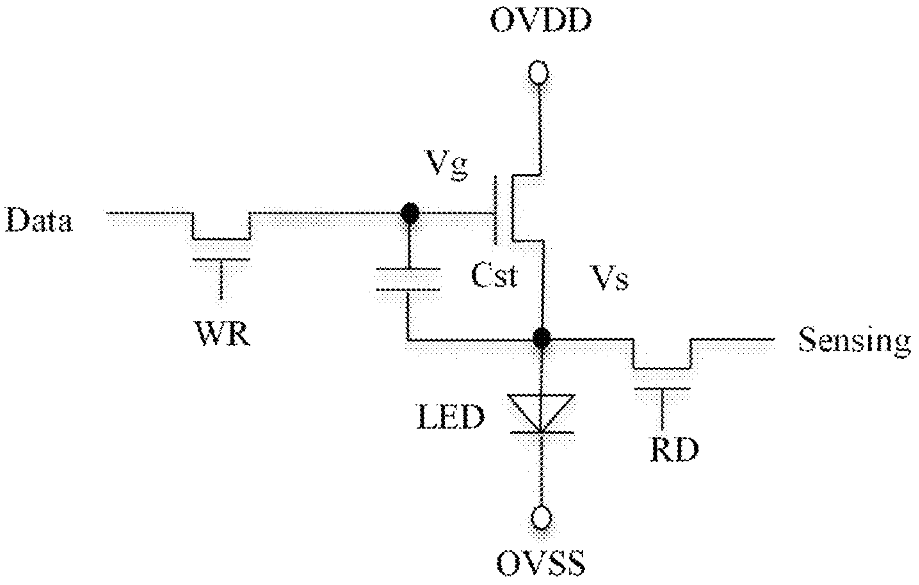
FIG. 2 is a schematic diagram of reason analysis for brightness differences occurred among display pictures of a display panel at different refresh rates.

FIG. 2 is a schematic diagram of reason analysis for brightness differences occurred among display pictures of the display panel at different refresh rates. In particular, that a pixel driving circuit in the display panel uses a structure of 3T1C (i.e., three transistors and one capacitor) is taken as an example. In FIG. 2, Data denotes a data signal, Sensing denotes a sensing signal, OVDD denotes a first power supply terminal, OVSS denotes a second power supply terminal, RD and WR denote control signals, Vg denotes a gate potential, and Cst denotes a storage capacitor. Leakage of electricity of a light-emitting device LED would lead to a decrease of a potential at a node Vs, resulting in a decrease of current flowing through the light-emitting device LED, thereby causing a decrease of brightness of the light emitting device LED. Moreover, the transistors, the storage capacitor Cst and the light-emitting device LED themselves also have the issue of leakage of electricity, which affects the brightness of the light-emitting device LED. The variable refresh rate is achieved by varying a length of a vertical blanking interval for different refresh rates, but in the vertical blanking interval, all pixels in the display panel will suffer a leakage phenomenon. Accordingly, the change of frame rate would cause a change of leakage time, resulting in different display brightness of the display panel at different refresh rates.

FIG. 3A through FIG. 3G are schematic flowcharts associated with a display control method according to embodiments of the present disclosure. An exemplary embodiment of the present disclosure provides a display control method used for controlling display pictures of a display panel. The display control method includes: determining whether a low frame rate compensation function of the display panel is in an on state, when a frame rate of a current frame rendered by a graphics processor is smaller than a minimum refresh rate of the display panel; performing grayscale compensation on at least one frame of display picture in consecutive n frames of display pictures of the display panel, when the low frame rate compensation function is in the on state, where the consecutive n frames of display pictures include a current frame of display picture Fc corresponding to the current frame, and grayscales of the respective consecutive n frames of display pictures are the same, and n is an integer greater than 1; and controlling the display panel to display the compensated consecutive n frames of display pictures.

The display control method according to the embodiment of the present disclosure, by way of determining whether a low frame rate compensation function of the display panel is in an on state when a frame rate of a current frame rendered by a graphics processor is smaller than a minimum refresh rate of the display panel, then performing grayscale compensation on at least one frame of display picture in consecutive n frames of display pictures of the display panel when the low frame rate compensation function is in the on state, and controlling the display panel to display compensated the consecutive n frames of display pictures, can reduce display brightness of the display picture(s) of the display panel after multiplication of frame rate, and thus reduce a brightness difference between the display pictures of the display panel respectively before and after the multiplication of frame rate, thereby improving the problem of picture flickering caused by the multiplication of frame rate.

In an embodiment, whether the low frame rate compensation function of the display panel is in an on state can be determined according to whether frame rates corresponding to two adjacent frames conform to a rule of the low frame rate compensation function being in the on state. Correspondingly, the step of determining whether a low frame rate compensation function of the display panel is in an on state includes: determining, according to a first frame rate corresponding to a previous frame rendered by the graphics processor and the frame rate corresponding to the current frame, whether the low frame rate compensation function of the display panel is in the on state. The previous frame rendered by the graphics processor is located immediately before the current frame, and is consecutive with the current frame.

In an embodiment, whether the frame rates corresponding to the two adjacent frames conform to the rule of the low frame rate compensation function being in the on state can be determined according to a frame rate multiplication value set when the low frame rate compensation function is in the on state. Correspondingly, please continue to refer to FIG. 3B, the step of determining, according to a first frame rate corresponding to a previous frame rendered by the graphics processor and the frame rate corresponding to the current frame, whether the low frame rate compensation function of the display panel is in the on state includes: determining whether a difference between a product of the first frame rate and a frame rate multiplication value and the frame rate corresponding to the current frame exceeds a first preset range; and determining the low frame rate compensation function of the display panel is in the on state, when the difference between the product of the first frame rate and the frame rate multiplication value and the frame rate corresponding to the current frame is within the first preset range.

In an embodiment, the frame rate multiplication value is n, so that when the low frame rate compensation function is in the on state, the number of the compensated consecutive n frames of display pictures displayed by the display panel is the same as the number of multiplied frames by the frame rate multiplication value through the graphic processor. For example, the frame rate multiplication value is equal to 3, and the variable refresh rate variation range of the display panel is 48 Hz-144 Hz; the low frame rate compensation function of the display panel can be determined in the on state by determining $3*fps'-fps0 \in diff1$, where fps' represents the first frame rate, fps0 represents the frame rate corresponding to the current frame, and diff1 represents the first preset range. In an embodiment, the first preset range may be greater than 0 and smaller than or equal to a maximum refresh rate of the display panel. For instance, the maximum refresh rate of the display panel is 144 Hz, the first preset range may be greater than 0 and smaller than or equal to 144.

In addition, when the variable refresh rate function is in the on state, and the frame rate is not less than the minimum refresh rate of the display panel, a change of the refresh rate of the display panel is coincided with a change of the frame rate. When the frame rate jumps from a low frame rate to a high frame rate, correspondingly, the refresh rate will also synchronously jump from a low refresh rate to a high refresh rate, but the refresh rate jumped from the low refresh rate to the high refresh rate will cause a brightness difference of display picture of the display panel. For example, the variable refresh rate variation range of the display panel is 48 Hz-144 Hz, and after the variable refresh rate function is in the on state, the refresh rate of the display panel fluctuates in a range of 48 Hz-144 Hz, resulting in a brightness difference of display picture of the display panel. The frame rate multiplication value may be stored in a memory in the form of a numerical value. Therefore, the determining whether the difference between the product of the first frame rate and the frame rate multiplication value and the frame rate corresponding to the current frame is within the first preset range may cover the situation that a brightness difference occurs among the display pictures of the display panel due to changes of the frame rate and the refresh rate when the variable refresh rate function is in the on state. Accordingly, the display control method according to the embodiment of the present disclosure can be used to improve the brightness difference problem of display pictures of the display panel caused by a change of refresh rate resulting from a change of frame rate when the low frame rate compensation function is in an off state and the variable refresh rate function is in the on state. That is, when the frame rate of the current frame rendered by the graphics processor is smaller than the minimum refresh rate of the display panel, after the step of determining whether a low frame rate compensation function of the display panel is in an on state, the display control method further includes: performing grayscale compensation on a display picture of the display panel (to obtain a compensated display picture) when the low frame rate compensation function is in an off state and the variable refresh rate function is in the on state; and controlling the display panel to display compensated the display picture.

In an embodiment, when performing grayscale compensation on at least one frame of display picture in the consecutive n frames of display pictures of the display panel, the compensation can be performed according to an original grayscale corresponding to the display picture to be compensated as per a proportional relationship. In an embodiment, the proportional relationship may be fixed, or the compensation may be performed by a compensation table in a manner that different refresh rates correspond to different compensation proportions. In an embodiment, the proportional relationship may be set separately according to different light-emitting colors of sub-pixels (for example, set separately according to RG/B), so as to perform compensation calculations respectively for the sub-pixels of different light-emitting colors.

In an embodiment, a plurality of grayscale brightness data correspond to different refresh rates can be obtained according to actually measured gamma curves at the different refresh rates. For example, setting a fixed refresh rate for the display panel, and then measuring R/G/B brightness data of the display panel under 0-255 grayscales by using a brightness acquisition device; theoretically, gamma curves at all refresh rates in the refresh rate range supported by the display panel need to be measured, but in practice, gamma curves at some of the refresh rates can be selected to be measured in order to give consideration to factors such as efficiency. Afterwards, brightness differences corresponding to a same grayscale at different refresh rates are analyzed, and then a plurality of calculation methods are used for verifying on the display panel, thereby obtaining a universal fixed proportional relationship or a compensation table corresponding to different refresh rates.

In an embodiment, proportional relationships stored in the compensation table are compensation values; that is, the compensation table stores a correspondence between preset frame rates and the compensation values. In an embodiment, the compensation table can be set according to a minimum refresh rate supported by the display panel. For example, the compensation table is stored with compensation values corresponding to a minimum frame rate fps_min to a maximum frame rate fps_max, the minimum frate rate fps_min may be greater than or equal to ⅓ of the minimum refresh rate supported by the display panel, and the maximum frame rate fps_max may be 1 less than the minimum refresh rate supported by the display panel. For instance, if the refresh rate range supported by the display panel is 48 Hz-144 Hz, the minimum frame rate fps_min may be 16 Hz, and the maximum frame rate fps_max may be 47 Hz.

Figure 4B:
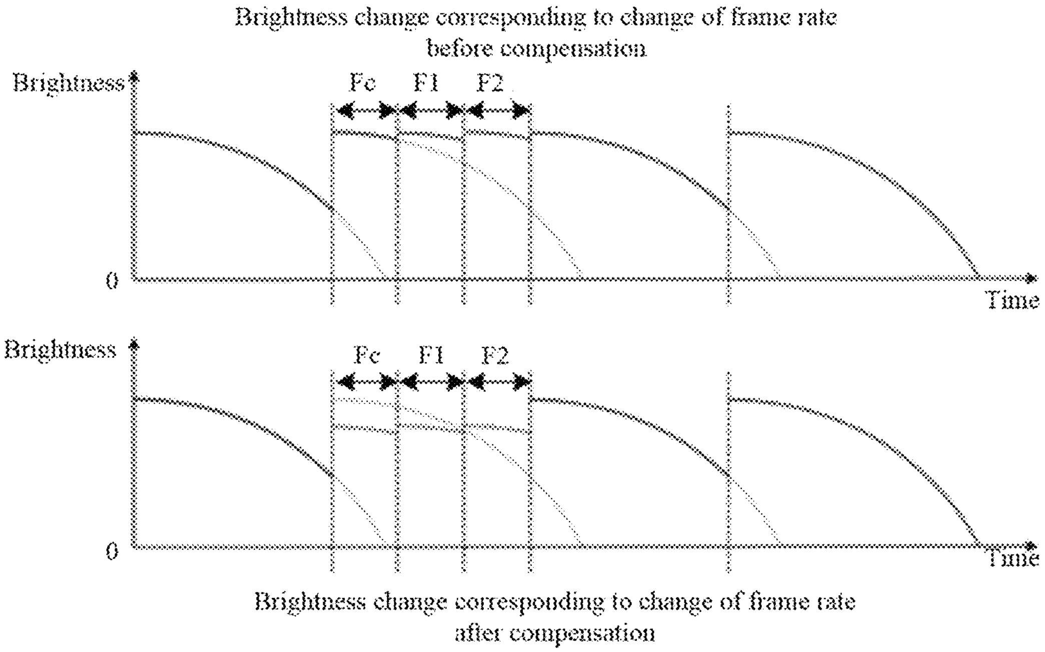

FIG. 4A and FIG. 4B are schematic diagrams of brightness change curves of consecutive n frames of display pictures of the display panel respectively before and after compensation according to an embodiment of the present disclosure. Specifically, L1 denotes a preset brightness attenuation curve, L2 denotes a brightness attenuation curve corresponding to one frame of display picture before the current frame of display picture Fc, and L3 denotes a brightness attenuation curve corresponding to one frame of display picture after a second frame of display picture F2. In an embodiment, a refresh rate corresponding to the frame of display picture before the current frame of display picture Fc is equal to a minimum refresh rate of the display panel, and a refresh rate corresponding to the frame of display picture after the second frame of display picture F2 is equal to the minimum refresh rate of the display panel. For example, the refresh rate corresponding to L2 is 48 Hz, and the refresh rate corresponding to L3 is 48 Hz. In an embodiment, refresh rates respectively corresponding to the current frame of display picture Fc, the first frame of display picture F1 and the second frame of display picture F2 each are 141 Hz.

In an embodiment, the first frame of display picture F1 after the current frame of display picture Fc and the second frame of display picture F2 after the first frame of display picture F1 can be compensated according to a difference between the brightness attenuation curve corresponding to the consecutive n frames of display pictures and the preset brightness attenuation curve L1 corresponding to the consecutive n frames of display pictures when the low frame rate compensation function of the display panel is in the on state. The consecutive n frames of display pictures further include the first frame of display picture F1 after the current frame of display picture Fc, and the second frame of display picture F2 after the first frame of display picture F1.

In an embodiment, compensation values stored in the compensation table corresponding to the first frame of display picture F1 and the second frame of display picture F2 may be different. In an embodiment, a form of the compensation table is shown as the following Table 1.

TABLE 1

| Frame rate corresponding to current frame | First compensation value | Second compensation value |
|---|---|---|
| fps_min | k1_1 | k2_1 |
| fps_min + 1 | k1_2 | k2_2 |
| . . . | . . . | . . . |
| fps_max | k1_n | k2_n |

Figure 3A:
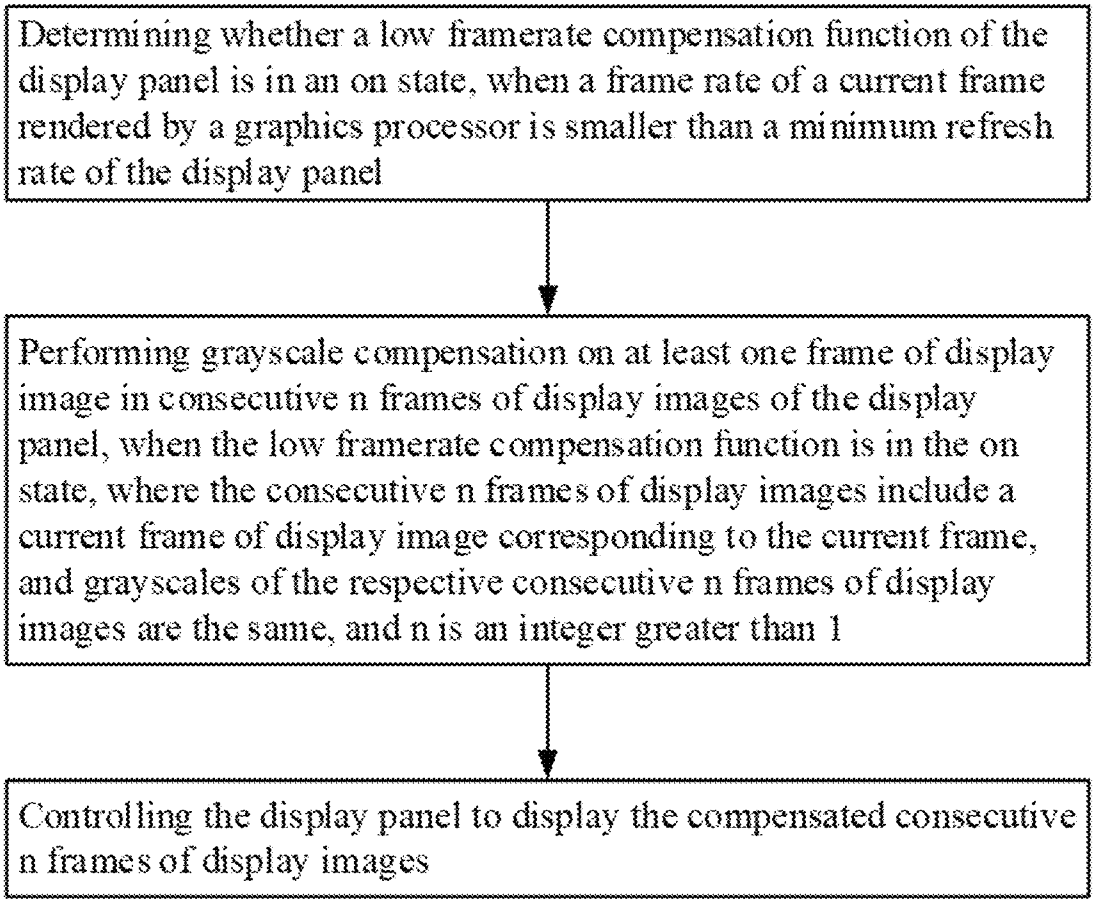
Figure 3B:
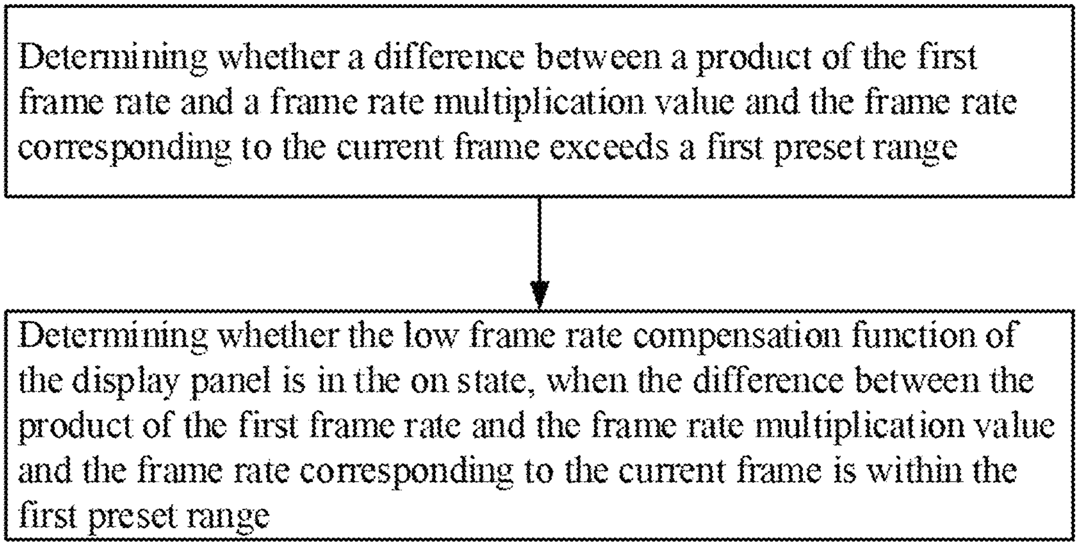
Figure 3C:
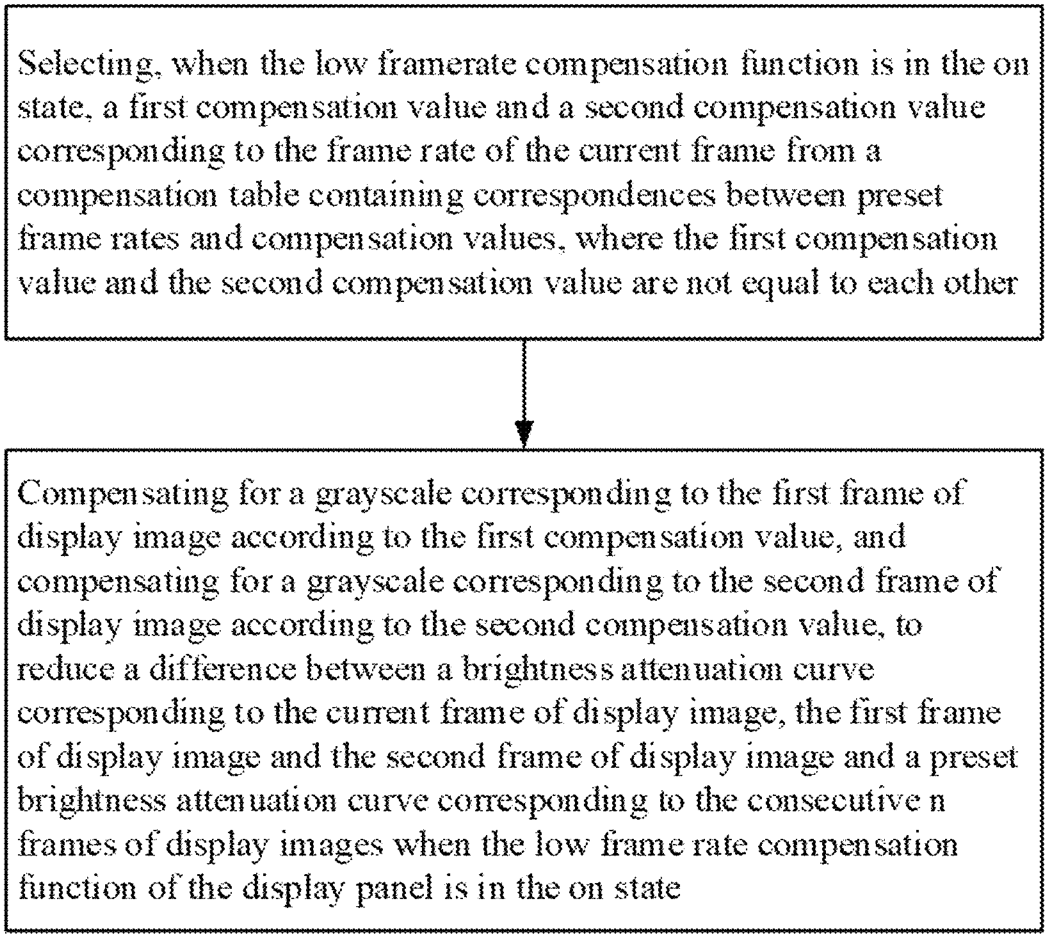

Correspondingly, please continue to refer to FIG. 3C, the step of performing grayscale compensation on at least one frame of display picture in consecutive n frames of display picture of the display panel when the low frame rate compensation function is in the on state, includes: selecting, when the low frame rate compensation function is in the on state, a first compensation value and a second compensation value both corresponding to the frame rate of the current frame from a compensation table containing correspondences between preset frame rates and compensation values, where the first compensation value and the second compensation value are not equal to each other; compensating for a grayscale corresponding to the first frame of display picture F1 according to the first compensation value, and compensating for a grayscale corresponding to the second frame of display picture F2 according to the second compensation value, thereby reducing a difference between a brightness attenuation curve corresponding to all of the current frame of display picture Fc, the first frame of display picture F1 and the second frame of display picture F2 and a preset brightness attenuation curve corresponding to the consecutive n frames of display picture when the low frame rate compensation function of the display panel is in the on state, as shown in FIG. 4A.

Figure 3D:
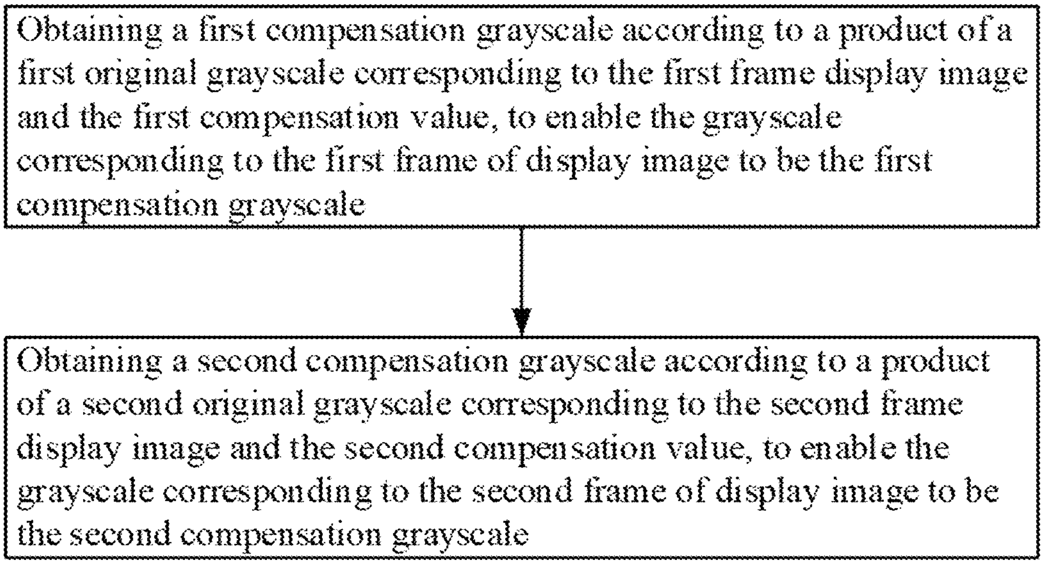

In an embodiment, please continue to refer to FIG. 3D, the step of compensating for a grayscale corresponding to the first frame of display picture F1 according to the first compensation value, and compensating for a grayscale corresponding to the second frame of display picture F2 according to the second compensation value, includes: obtaining a first compensation grayscale according to a product of a first original grayscale corresponding to the first frame of display picture F1 and the first compensation value, to enable the first original grayscale corresponding to the first frame of display picture F1 to be the first compensation grayscale; and obtaining a second compensation grayscale according to a product of a second original grayscale corresponding to the second frame of display picture F2 and the second compensation value, to enable the second original grayscale corresponding to the second frame of display picture F2 to be the second compensation grayscale.

In an embodiment, the first compensation value corresponding to the first frame of display picture F1 and the second compensation value corresponding to the second frame of display picture F2 are sequentially decreased in proportion. The preset frame rates include the frame rate corresponding to the current frame.

In an embodiment, the current frame of display picture Fc, the first frame of display picture F1 and the second frame of display picture F2 can be compensated for according to a difference between an average brightness corresponding to the consecutive n frames of display pictures and a preset average brightness corresponding to the consecutive n frames of display pictures when the low frame rate compensation function of the display panel is in the on state.

In an embodiment, compensation values stored in the compensation table corresponding to the current frame of display picture Fc, the first frame of display picture F1 and the second frame of display picture F2 may be the same. In an embodiment, a form of the compensation table is shown as the following Table 2.

TABLE 2

| Frame rate corresponding to current frame | Compensation value |
|---|---|
| fps_min | k1 |
| fps_min + 1 | k2 |
| . . . | . . . |
| fps_max | kn |

Figure 3E:
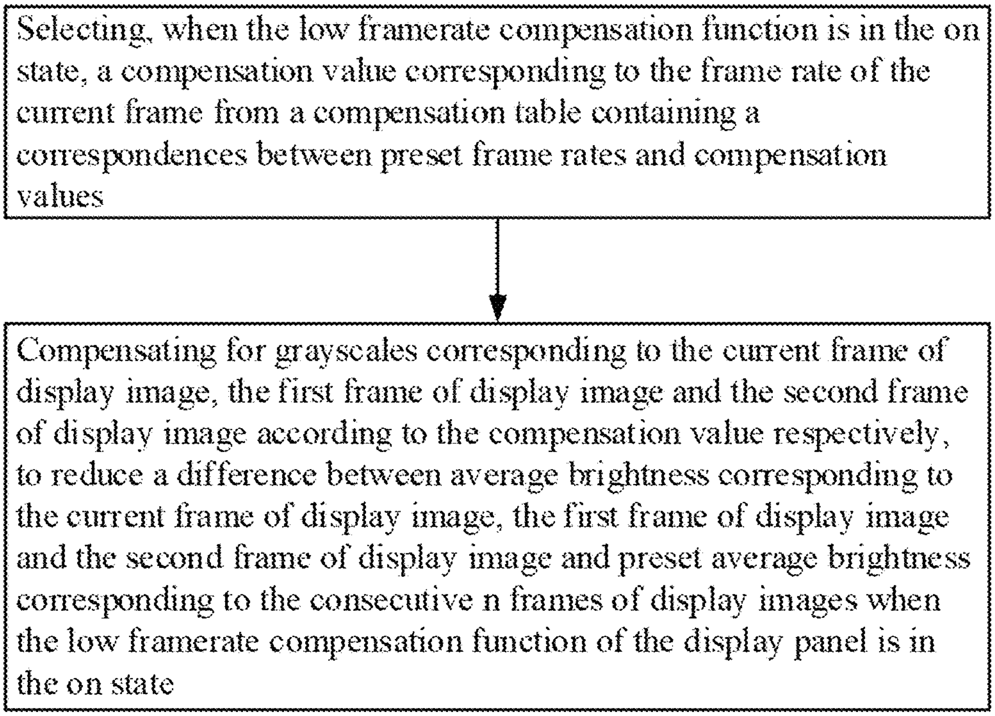

Correspondingly, please continue to refer to FIG. 3E, the step of performing grayscale compensation on at least one frame of display picture in consecutive n frames of display picture of the display panel when the low frame rate compensation function is in the on state, includes: selecting, when the low frame rate compensation function is in the on state, a compensation value corresponding to the frame rate of the current frame from a compensation table containing a correspondence between preset frame rates and compensation values; and compensating for grayscales corresponding to the current frame of display picture Fc, the first frame of display picture F1 and the second frame of display picture F2 respectively according to the compensation value, to reduce a difference between average brightness corresponding to all of the current frame of display picture Fc, the first frame of display picture F1 and the second frame of display picture F2 and preset average brightness corresponding to the consecutive n frames of display pictures when the low frame rate compensation function of the display panel is in the on state, as shown in FIG. 4B.

Figure 3F:
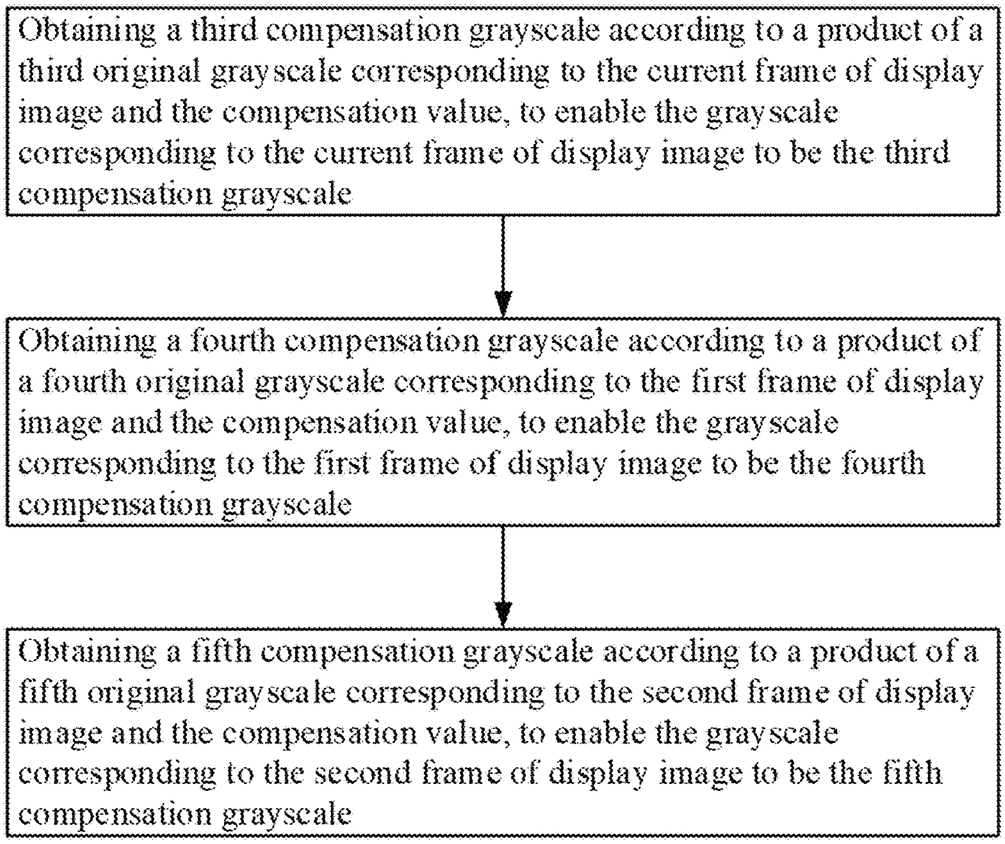

In an embodiment, please continue to refer to FIG. 3F, the step of compensating for grayscales corresponding to the current frame of display picture Fc, the first frame of display picture F1 and the second frame of display picture F2 respectively according to the compensation value, includes: obtaining a third compensation grayscale according to a product of a third original grayscale corresponding to the current frame of display picture Fc and the compensation value, to enable the third original grayscale corresponding to the current frame of display picture Fc to be the third compensation grayscale; obtaining a fourth compensation grayscale according to a product of a fourth original grayscale corresponding to the first frame of display picture F1 and the compensation value, to enable the fourth original grayscale corresponding to the first frame of display picture F1 to be the fourth compensation grayscale; and obtaining a fifth compensation grayscale according to a product of a fifth original grayscale corresponding to the second frame of display picture F2 and the compensation value, to enable the fifth original grayscale corresponding to the second frame of display picture F2 to be the fifth compensation grayscale.

In an embodiment, in order to realize grayscale compensation on the current frame of display picture Fc, it is needed to obtain a refresh rate corresponding to the current frame of display picture Fc in advance before the display panel displays the current frame of display picture Fc. Therefore, a frame buffer may be set in a control module, so that the current frame of display picture Fc, before being displayed by the display panel, firstly passes through the frame buffer, and then the refresh rate corresponding to the current frame of display picture Fc is obtained by counting blanking intervals, thereby completing the obtaining of the frame rate corresponding to the current frame. In an embodiment, the control module includes a controller, the controller includes a timing controller, and the frame buffer is disposed in the timing controller.

In an embodiment, after the low frame rate compensation function is in the on state, whether the low frame rate compensation function is in an off state in a current state can be determined according to a difference of frame rates corresponding to two adjacent frames (former and latter frames). If the low frame rate compensation function is still in the on state, continuing performing grayscale compensation on the display picture; whereas if the low frame rate compensation function is in the off state, not performing the grayscale compensation any more, starting from the current frame of display picture Fc. Correspondingly, please continue to refer to FIG. 3G, after the step of controlling the display panel to display the compensated consecutive n frames of display pictures, the display control method further includes: determining whether a difference between a product of the frame rate of the current frame rendered by the graphics processor and n and a frame rate of a previous frame rendered by the graphics processor exceeds a second preset range; and determining, when the difference between the product of the frame rate of the current frame rendered by the graphics processor and n and the frame rate of the previous frame rendered by the graphics processor is within the second preset range, the low frame rate compensation function of the display panel is in an off state to stop compensating for a grayscale corresponding to a display picture of the display panel starting from the current frame.

That n is equal to 3 and a variable refresh rate variation range of the display panel is 48 Hz-144 Hz are taken as an example. The low frame rate compensation function is determined to be in the on state by determining 3*fps1'-fps2∈diff2, where fps1' denotes the frame rate corresponding to the current frame, fps2 denotes the frame rate of the previous frame, and diff2 denotes the second present range. In an embodiment, the second preset range may be greater than 0 and smaller than or equal to the maximum refresh rate of the display panel. For example, the maximum refresh rate of the display panel is 144 Hz, the second preset range may be greater than 0 and smaller than or equal to 144.

Figure 5:
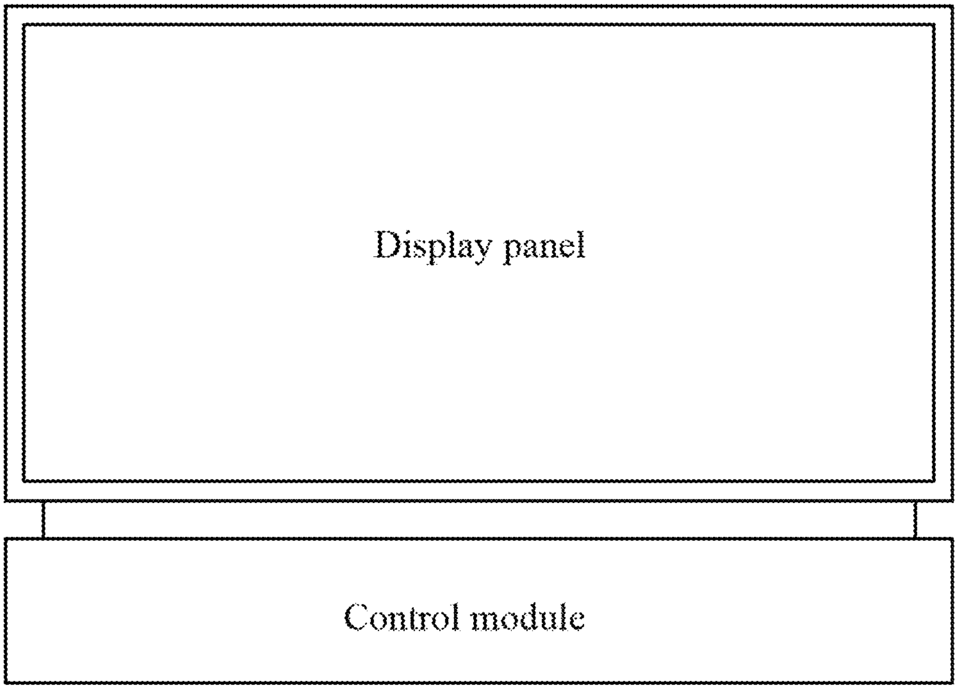
FIG. 5 is a schematic structural view of a display device according to an embodiment of the present disclosure.

FIG. 5 is a schematic structural view of a display device according to an embodiment of the present disclosure. The present disclosure further provides a display device including a display panel and a control module.

The display panel is configured to display a picture. In an embodiment, the display panel may be a passive illuminated display panel (such as a liquid crystal display panel), or a self-illuminated display panel (such as a display panel including organic LEDs, mini-LEDs or micro-LEDs).

The control module is electrically connected to the display panel. The control module is configured to: determine, when a frame rate of a current frame rendered by a graphics processor is smaller than a minimum refresh rate of the display panel, whether a low frame rate compensation function of the display panel is in an on state; perform, when the low frame rate compensation function is in the on state, grayscale compensation on at least one frame of display picture in consecutive n frames of display pictures of the display panel, where the consecutive n frames of display pictures include a current frame of display picture corresponding to the current frame, and grayscales of the respective consecutive n frames of display pictures are the same, n is an integer greater than 1; and control the display panel to display the compensated consecutive n frames of display pictures.

In an embodiment, the control module includes a controller, including a frame buffer configured to obtain the frame rate of the current frame.

In an embodiment, the controller includes a timing controller, and the frame buffer is disposed in the timing controller. In an embodiment, the control module further includes a memory, and the memory is configured to store a correspondence between preset frame rates and compensation values, so that the control module can perform grayscale compensation on at least one frame of display picture in the consecutive n frames of display pictures through the correspondence between the preset frame rates and the compensation values. The preset frame rates include the frame rate of the current frame.

It can be understood that, the display device may be a mobile display device (such as a notebook computer, a mobile phone, etc.), a non-portable terminal (such as a desktop computer, a television, etc.), a measuring device (such as a sports bracelet, a thermometer, etc.), or the like.

Specific examples are used herein to illustrate the principle and embodiments of the present disclosure, the description of the foregoing embodiments is only for the purpose of helping to understand the method and the core idea of the present disclosure; and meanwhile, for those skilled in the art, according to the idea of the present disclosure, there may be modifications on the specific embodiments and the scope of application. In conclusion, the contents of the present specification should not be construed as limitations of the present disclosure.

What is claimed is:

1. A display device, comprising:

a display panel configured to display a picture; and a control module configured to:

in response to a frame rate of a current frame rendered by a graphics processor being smaller than a minimum refresh rate of the display panel, determining whether a low frame rate compensation function of the display panel is in an on state; and in response to determining that the low frame rate compensation function of the display panel is in the on state, performing grayscale compensation on at least one frame of display picture in consecutive n frames of display pictures of the display panel to control the display panel to display the compensated consecutive n frames of display pictures, wherein the consecutive n frames of display pictures comprise a current frame of display picture corresponding to the current frame, the consecutive n frames of display pictures have the same grayscales, and n is an integer greater than 1.

2. The display device according to claim 1, wherein the control module comprises:

a controller, comprising a frame buffer configured to obtain the frame rate of the current frame.

3. A display control method for controlling a display picture of a display panel, comprising:

in response to a frame rate of a current frame rendered by a graphics processor being smaller than a minimum refresh rate of the display panel, determining whether a low frame rate compensation function of the display panel is in an on state;

in response to determining that the low frame rate compensation function of the display panel is in the on state, performing grayscale compensation on at least one frame of display picture in consecutive n frames of display pictures of the display panel, wherein the consecutive n frames of display pictures comprise a current frame of display picture corresponding to the current frame, the consecutive n frames of display pictures have the same grayscales, and n is an integer greater than 1; and controlling the display panel to display the compensated consecutive n frames of display pictures.

4. The display control method according to claim 3, wherein the determining whether the low frame rate compensation function of the display panel is in the on state comprises:

determining, based on a first frame rate corresponding to a previous frame rendered by the graphics processor and the frame rate corresponding to the current frame, whether the low frame rate compensation function of the display panel is in the on state.

5. The display control method according to claim 4, wherein the determining, based on the first frame rate corresponding to the previous frame rendered by the graphics processor and the frame rate corresponding to the current frame, whether the low frame rate compensation function of the display panel is in the on state comprises:

determining whether a difference between a product of the first frame rate and a frame rate multiplication value and the frame rate corresponding to the current frame exceeds a first preset range, wherein the frame rate multiplication value is n; and in response to determining that the difference is in the first preset range, determining that the low frame rate compensation function of the display panel is in the on state.

6. The display control method according to claim 3, wherein the consecutive n frames of display pictures further comprise a first frame of display picture after the current frame of display picture, and a second frame of display picture after the first frame of display picture;

wherein the performing of grayscale compensation on the at least one frame of display picture comprises:

in response to determining that the low frame rate compensation function is in the on state, selecting a first compensation value and a second compensation value both corresponding to the frame rate of the current frame from a compensation table including correspondences between preset frame rates and compensation values, wherein the first compensation value and the second compensation value are not equal to each other; and compensating for a grayscale corresponding to the first frame of display picture based on the first compensation value, and compensating for a grayscale corresponding to the second frame of display picture based on the second compensation value, to reduce a difference between a brightness attenuation curve corresponding to all of the current frame of display picture, the first frame of display picture, and the second frame of display picture and a preset brightness attenuation curve corresponding to the consecutive n frames of display pictures in response to the low frame rate compensation function of the display panel being in the on state.

7. The display control method according to claim 6, wherein the compensating for a grayscale corresponding to the first frame of display picture based on the first compensation value, and compensating for a grayscale corresponding to the second frame of display picture based on the second compensation value comprises:

obtaining a first compensation grayscale based on a product of a first original grayscale corresponding to the first frame of display picture and the first compensation value, to enable the first original grayscale corresponding to the first frame of display picture to be the first compensation grayscale; and obtaining a second compensation grayscale based on a product of a second original grayscale corresponding to the second frame of display picture and the second compensation value, to enable the second original grayscale corresponding to the second frame of display picture to be the second compensation grayscale.

8. The display control method according to claim 3, wherein the consecutive n frames of display pictures further comprise a first frame of display picture after the current frame of display picture, and a second frame of display picture after the first frame of display picture;

wherein the performing of grayscale compensation on the at least one frame of display picture comprises:

in response to determining that the low frame rate compensation function is in the on state, selecting a compensation value corresponding to the frame rate of the current frame from a compensation table including correspondences between preset frame rates and compensation values; and compensating for grayscales corresponding to the current frame of display picture, the first frame of display picture and the second frame of display picture based on the compensation value, respectively, to reduce a difference between average brightness corresponding to all of the current frame of display picture, the first frame of display picture, and the second frame of display picture and preset average brightness corresponding to the consecutive n frames of display pictures in response to the low frame rate compensation function of the display panel being in the on state.

9. The display control method according to claim 8, wherein the compensating for grayscales corresponding to the current frame of display picture, the first frame of display picture and the second frame of display picture based on the compensation value, respectively comprises:

obtaining a third compensation grayscale based on a product of a third original grayscale corresponding to the current frame of display picture and the compensation value, to enable the third original grayscale corresponding to the current frame of display picture to be the third compensation grayscale;

obtaining a fourth compensation grayscale based on a product of a fourth original grayscale corresponding to the first frame of display picture and the compensation value, to enable the fourth original grayscale corresponding to the first frame of display picture to be the fourth compensation grayscale; and obtaining a fifth compensation grayscale based on a product of a fifth original grayscale corresponding to the second frame of display picture and the compensation value, to enable the fifth original grayscale corresponding to the second frame of display picture to be the fifth compensation grayscale.

10. The display control method according to claim 3, further comprising: after the controlling of the display panel to display the compensated consecutive n frames of display pictures, determining whether a difference between a product of the frame rate of the current frame rendered by the graphics processor and n and a frame rate of a previous frame rendered by the graphics processor exceeds a second preset range; and in response to determining that the difference is in the second preset range, determining that the low frame rate compensation function of the display panel is in an off state to stop compensating for a grayscale corresponding to a display picture of the display panel starting from the current frame.

* * * * *